United States Patent
Kardos

(10) Patent No.: US 8,186,424 B2
(45) Date of Patent: May 29, 2012

(54) CHARGE AIR COOLER

(75) Inventor: Zoltan Kardos, Södertälje (SE)

(73) Assignee: Scania CV AB (SE)

( * ) Notice: Subject to any disclaimer, the term of this patent is extended or adjusted under 35 U.S.C. 154(b) by 895 days.

(21) Appl. No.: 11/813,030

(22) PCT Filed: Feb. 13, 2006

(86) PCT No.: PCT/SE2006/000188
§ 371 (c)(1),
(2), (4) Date: Jul. 10, 2007

(87) PCT Pub. No.: WO2006/088411
PCT Pub. Date: Aug. 24, 2006

(65) Prior Publication Data
US 2008/0169092 A1 Jul. 17, 2008

(30) Foreign Application Priority Data
Feb. 21, 2005 (SE) ........................ 0500399

(51) Int. Cl.
*F28D 7/10* (2006.01)
(52) U.S. Cl. ............ 165/140; 165/83; 165/916; 165/41; 123/563
(58) Field of Classification Search .................. 165/157, 165/916, 82, 182, 140, 143; 123/41.56; 60/599
See application file for complete search history.

(56) References Cited

U.S. PATENT DOCUMENTS

| | | | |
|---|---|---|---|
| 2,368,403 A * | 1/1945 | Barnes ...................... | 29/890.046 |
| 4,929,161 A * | 5/1990 | Aoki et al. ....................... | 418/83 |
| 5,174,369 A * | 12/1992 | Glass .............................. | 165/155 |
| 6,688,292 B2 * | 2/2004 | Ruppel et al. ............... | 165/134.1 |
| 6,755,158 B2 | 6/2004 | Knecht et al. | |
| 7,165,537 B2 * | 1/2007 | Agee et al. ..................... | 123/563 |
| 2003/0037913 A1 * | 2/2003 | Knecht et al. ................. | 165/122 |
| 2003/0234008 A1 * | 12/2003 | Van Winkle ............... | 123/559.1 |

FOREIGN PATENT DOCUMENTS

GB 2 023 797 1/1980
GB 2 375 388 11/2002

OTHER PUBLICATIONS

International Search Report PCT/SE2006/000188 dated May 24, 2006.

* cited by examiner

*Primary Examiner* — Allen Flanigan
*Assistant Examiner* — Indrajit Ghosh
(74) *Attorney, Agent, or Firm* — Ostrolenk Faber LLP

(57) ABSTRACT

A charge air cooler comprises at least one tubular element with an internal flow duct for guiding compressed air, and a tank for receiving the compressed air before it is led through the flow duct. The compressed air is cooled by a first cooling medium of ambient air as it passes through the flow duct. A cooling element at least partly situated inside the tank provides the compressed air in the tank with a first step of cooling before the air is led to the flow duct wherein the air undergoes a second step of cooling.

10 Claims, 1 Drawing Sheet

CHARGE AIR COOLER

CROSS REFERENCE TO RELATED APPLICATION

The present application is a 35 U.S.C. §§371 national phase conversion of PCT/SE2006/000188, filed Feb. 13, 2006, which claims priority of Swedish Application No. 0500399-1, filed Feb. 21, 2005. The PCT International Application was published in the English language.

BACKGROUND TO THE INVENTION, AND STATE OF THE ART

The present invention relates to a charge air cooler and particularly to a pre-cooling device for the air, before the air passes through a cooling device.

The amount of air which can be supplied to a supercharged combustion engine in a vehicle depends on the pressure of the air but also on the temperature of the air. Supplying the largest possible amount of air to a supercharged combustion engine entails cooling compressed air in a charge air cooler before it is led to the combustion engine. The charge air cooler is usually situated in front of the conventional radiator in a vehicle. A charge air cooler usually comprises two tanks and a cooler portion with a plurality of tubular elements arranged in parallel which connect the tanks to one another. The parallel tubular elements are arranged at a distance from one another so that surrounding cold air can flow between the tubular elements and cool the compressed air in the tubular elements. A well-dimensioned charge air cooler can cool the compressed air to a temperature more or less corresponding to the temperature of the surrounding air.

To reduce emissions, there is a trend towards increasingly powerful supercharged diesel engines. The air led to a powerfully supercharged diesel engine is compressed to a higher pressure, which also causes the temperature of the air to rise. The result is more exacting requirements for the charge air cooler which has to cool the compressed air before it is led to the diesel engine. The tubular elements which lead the compressed air in the cooler portion of a conventional charge air cooler are usually made of aluminium. A charge air cooler of relatively small dimensions made of aluminium can have a high cooling capacity, because aluminium is a material with very good heat transfer characteristics. However, the strength of aluminium decreases at high temperatures. In cases where the air is compressed to such a pressure as to reach temperatures exceeding 250° C. it is usually not possible to use aluminium as material for the tubular elements.

One possibility is to make the tubular elements of charge air coolers of an alternative material, e.g. steel, which has a higher strength at high temperatures. However, such alternative materials usually have inferior heat-conducting characteristics to those of aluminium and are usually also heavier. Charge air coolers made of such alternative materials will therefore occupy significantly more space and be more expensive to make.

GB 2 023 797 refers to a supercharged combustion engine in which compressed air is cooled in two steps before being led to the combustion engine. As a first step, the compressed air is cooled in a first heat exchanger by the coolant which also cools the combustion engine. As a second step, the compressed air is cooled in a second heat exchanger by surrounding air. The two heat exchangers are mounted on one another so that the compressed air is led directly from the first heat exchanger to the second heat exchanger.

SUMMARY OF THE INVENTION

The object of the present invention is to provide a charge air cooler which can bring about effective cooling of compressed air which is at a high temperature, and which can at the same time be of lightweight and compact construction.

This object is achieved with the charge air cooler of the invention. Air which is compressed to a high pressure inevitably also reaches a high temperature. The high temperature of the compressed air means that conventional charge air coolers with tubular elements made of material with good heat-conducting characteristics can often not be used for guiding compressed air. According to the invention, the first tank of the charge air cooler is provided with a cooling element arranged inside it which cools the hot compressed air as a first step inside the tank. The result is that the compressed air is at a considerably lower temperature when it leaves the first tank and is led into the tubular elements of the charge air cooler for residual cooling as a second step. It is thus possible to use tubular elements made of conventional material with good heat-conducting characteristics. The first tank need not be made appreciably larger to accommodate such a cooling element. The charge air cooler according to the invention can therefore be of substantially the same dimensions as a conventional charge air cooler but have a considerably greater cooling capacity. Such a charge air cooler is of course suitable for use in vehicles with a limiting fitting space where compressed air at a high temperature has to be cooled before being led to a supercharged combustion engine.

According to an embodiment of the present invention, the cooling element comprises at least one tubular element adapted to leading a second cooling medium along its extent inside the tank. When hot compressed air comes into contact with an outside surface of the tubular component, which has the second cooling medium flowing through it, the compressed air undergoes cooling. A plurality of tubular components may be arranged parallel inside the tank. The tubular components may be provided with protruding portions of material so that the cooling element has an increased contact surface with respect to the compressed air in the tank. The result is a more effective cooling of the compressed air inside the tank. The tubular components may be of substantially any desired form.

According to another preferred embodiment of the present invention, the charge air cooler comprises a seal means arranged between a surface which defines an aperture of the tank and a surface of the cooling element. To enable the second cooling medium to be led into the tank, it is necessary that the tank be provided with at least one aperture. The compressed air in the tank will be at a relatively large positive pressure relative to ambient pressure. The characteristics of the seal therefore need to be such that it can withstand relatively large pressure differences. The seal means must also have the characteristic of being able to absorb the relative movements which occur between the tank and the cooler element when the tank is heated by the warm compressed air.

According to a preferred embodiment of the present invention, the second cooling medium which is led through the tubular component is liquid. A cooling element which uses a liquid medium can be made significantly more compact than a cooling element which uses a gaseous cooling medium. The possibility of the cooling element being made small and compact is a prerequisite for being able to accommodate it inside the first tank. With advantage, the second cooling medium is the liquid of a cooling system whose main function is to cool a combustion engine. As such a cooling system is usually already present close to the charge air cooler, it is advantageous to use the already existing radiator fluid of that cooling system.

According to a preferred embodiment of the present invention, the tubular element of the charge air cooler is made of a material with good heat-conducting characteristics. Such a choice of material is a prerequisite for achieving a compact charge air cooler. With advantage, the tubular element is made of aluminium. Aluminium is a relatively inexpensive and lightweight material which has very good heat-conducting characteristics. Another characteristic of aluminium, however, is that its strength is reduced at high temperature. With suitable dimensioning of the cooling element, the compressed air in the first tank will nevertheless be cooled to such a temperature that tubular elements made of aluminium can be used in the cooler portion of the charge air cooler.

According to a preferred embodiment of the present invention, the first cooling medium takes the form of surrounding air caused to flow past the tubular element. The charge air cooler may be arranged at a front portion of a vehicle in front of the vehicle's radiator for cooling the radiator fluid of the cooling system for cooling the vehicle's engine. A radiator fan may be used for drawing surrounding air through the charge air cooler and the conventional radiator.

BRIEF DESCRIPTION OF THE DRAWINGS

A preferred embodiment of the invention is described below by way of example with reference to the attached drawings, in which.

DETAILED DESCRIPTION OF A PREFERRED EMBODIMENT OF THE INVENTION

Figure 1:
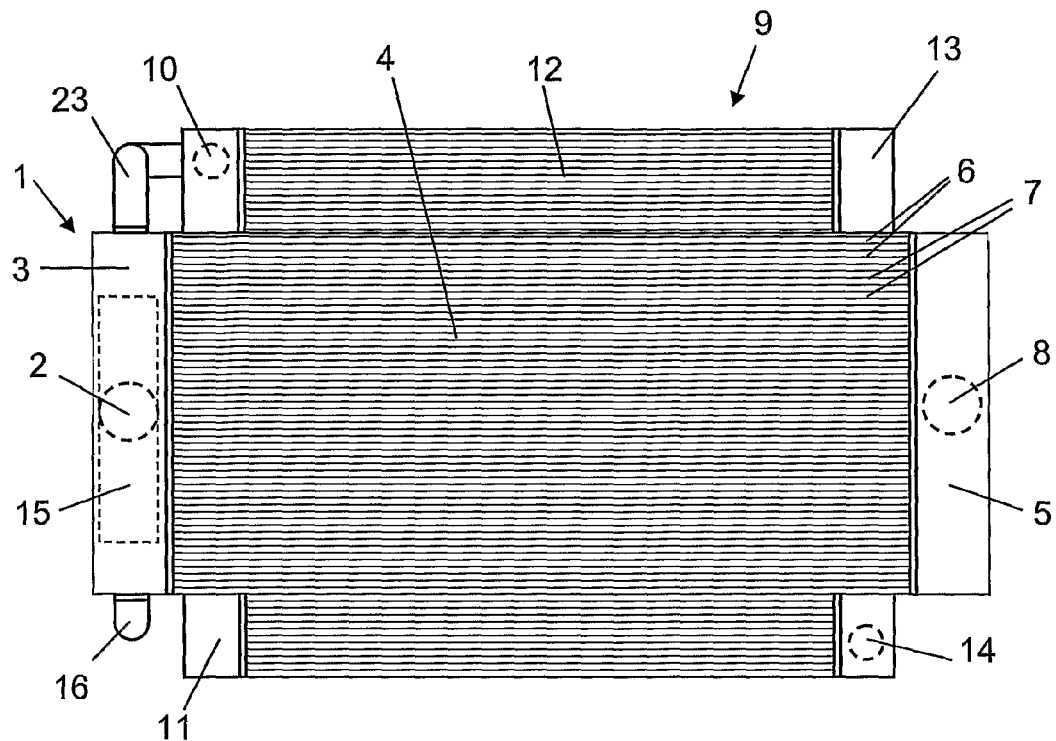
FIG. 1 depicts a charge air cooler according to the present invention.

FIG. 1 depicts a charge air cooler 1 which may for example be fitted at a front portion of a vehicle powered by a supercharged combustion engine which may be a diesel engine. A supercharged combustion engine needs a supply of compressed air. The function of the charge air cooler 1 is to cool the compressed air before it is led to the supercharged combustion engine. The charge air cooler 1 comprises an inlet 2 to a first tank 3 which is intended to receive warm compressed air from a compressor. The charge air cooler 1 comprises a cooler portion 4 which extends between the first tank 3 and a second tank 5. The cooler portion 4 comprises a plurality of tubular elements 6 extending in a substantially rectilinear manner in a common plane between the first tank 3 and the second tank 5.

The tubular elements 6 are arranged parallel at a substantially uniform distance from one another so that there are regular gaps 7 between the tubular elements 6. Surrounding air can flow through gaps 7 between the tubular elements 6. The flow of surrounding air through the cooler portion 4 of the charge air cooler may be caused by the vehicle's movement and/or by a radiator fan which draws air through the cooler portion 4. The surrounding air is usually at a considerably lower temperature than the compressed air. The surrounding air therefore cools the compressed air which is led through the tubular elements 6. The second tank 5 receives the cooled compressed air from the respective tubular elements 6, after which the air is led out from the second tank 5 via an outlet 8. The cooled compressed air is thereafter led via suitable pipelines to an inlet pipe of the supercharged combustion engine.

A conventional cooling element 9 is arranged behind the charge air cooler 1 to cool a radiator fluid which is circulated in a cooling system whose main function is to cool the supercharged combustion engine. The cooling element 9 comprises an inlet 10 to an inlet tank 11 which receives warm radiator fluid. From the inlet tank 11, the radiator fluid is led through a cooler portion 12 which extends between the inlet tank 11 and an outlet tank 13. The cooler portion 12 may in a conventional manner comprise a plurality of tubular elements which extend between the inlet tank 11 and the outlet tank 13. The tubular elements are arranged at a distance from one another so that there are regular gaps between adjacent tubular elements. Surrounding air can thus flow through the gaps between the tubular elements. The surrounding air thus cools the radiator fluid which is led through the cooler portion 12. The outlet tank 13 receives the cooled radiator fluid from the cooler portion 12, after which it is led out from the cooling element 9 via an outlet 14. The cooled radiator fluid can thereafter be led to the supercharged combustion engine in order to cool the latter.

In order inter alia to reduce emissions, there is ever increasing use of powerfully supercharged diesel engines. The air which is led to such a supercharged diesel engine is compressed to a high pressure which causes the air to reach a corresponding high temperature. The resulting air temperature may be up to 290° C. The tubular elements 6 in a conventional charge air cooler are usually made of aluminium, a material which has very good heat transfer characteristics. However, the strength of aluminium decreases at high temperatures. For strength reasons it is therefore not possible to use a conventional charge air cooler with tubular elements made of aluminium for guiding compressed air at temperatures of the magnitude mentioned above.

Figure 2:
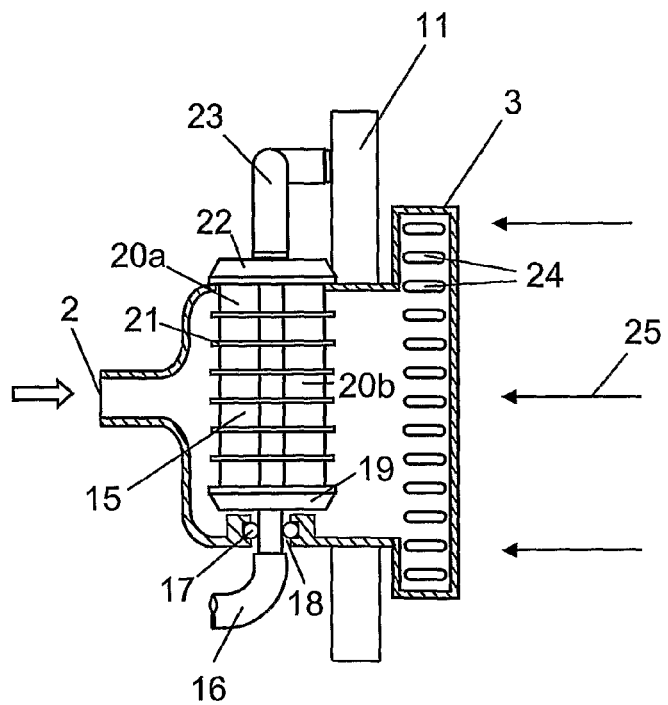
FIG. 2 depicts a section of the first tank of the charge air cooler in FIG. 1.

The charge air cooler 1 according to the present invention comprises a cooling element 15 fitted inside the first tank 3 of the charge air cooler 1. Such a cooling element 15 can be used for imparting to the compressed air a first step of cooling in the first tank 3. After passing through such a cooling element 15 which is suitably dimensioned, the compressed air will be at a low enough temperature for it to be possible to use tubular elements made of aluminium in the cooler portion 4 downstream. FIG. 2 depicts a section through the first tank 3 in FIG. 1. Radiator fluid is led via a pipeline 16 to the first tank 3. The pipeline 16 is connected to the cooling element 15 close to an aperture 17 of the tank. A radial seal 18 is arranged between a surface of the tank 3 which defines the aperture 17 and a surface of a tubular inlet portion of the cooling element 15. The radial seal 18 has the characteristic of being able to absorb axial movements between the tank 3 and the tubular inlet portion of the cooling element 15, i.e. movements in a vertical direction in FIG. 2. Such relative movements occur when the temperature of the material of the tank 3 varies. The annular seal 18 therefore provides good tightness of the aperture 17 substantially independently of the compressed air temperature. The cooling element comprises a talk 19 for receiving the radiator fluid. The cooling element 15 comprises thereafter two parallel tubular components 20a, b which extend in a substantially rectilinear manner through the internal space of the first tank 3 from one side to an opposite side. The tubular components 20a, b are provided with cooling flanges 21 for increasing the heat transfer surface with respect to the compressed air inside the first tank 3. The cooling element 15 also comprises a tank 22 for receiving the radiator fluid after it has passed through the tubular components 20a, b. The cooling element 15 may take the form of a module which can be fitted as a composite unit in the first tank 3. The warm radiator fluid is led from the tank 22 via a pipeline 23 to the inlet 10 of the cooler element 9. The radiator fluid is cooled in the cooler portion 12 of the cooler element 9.

During operation of the supercharged diesel engine, compressed air which may be at a temperature of up to about 290° C. is led into the first tank 3 via the inlet 2. The hot compressed air is cooled by coming into contact with the tubular components 20a, b and the cooling flanges 21 inside the tank 3. The temperature of the radiator fluid which is led through the tubular components 20a, b of the cooling element 15 may be 80-90° C. The cooling element 15 is dimensioned to effect a first step of cooling the compressed air in the tank 3 to a temperature which at least does not exceed a specific temperature. The specific temperature is such that compressed air at that temperature can be led through tubular elements 6 made of aluminium without risk to the strength of the tubular elements 6. After passing through the cooling element 15, the compressed air is led into a plurality of flow ducts 24 which each have an extent inside one of the tubular elements 6. The compressed air undergoes a second step of cooling by surrounding air 25 as it passes through the flow ducts 24 of the tubular elements 6, in which it is cooled to a temperature substantially corresponding to the temperature of the surroundings. The cooled compressed air is received in the second tank 5 before being led from there to the supercharged combustion engine.

Applying a first step of cooling to the compressed air makes it possible for tubular elements made of aluminium to be used for a second cooling step. As aluminium is a material with very good heat-conducting characteristics, the cooler portion 4 of the charge air cooler can be made rather light in weight and occupy little space. A cooling element 15 situated inside the first tank 3 needs no fitting space of its own in the vehicle. The charge air cooler will thus be of very compact construction and high cooling capacity.

The invention is in no way limited to the embodiment described with respect to the drawings but may be varied freely within the scopes of the claims. The cooling element arranged inside the first tank may be of substantially any desired functional configuration. The cooling element may have any desired number of tubular components which have a cross-sectional area of substantially any desired form.

The invention claimed is:
1. A charge air cooler comprising:
   at least one tubular element with an internal flow duct positioned and configured to guide compressed air;
   a first tank positioned and configured to receive the compressed air before the air is fed to and guided through the flow duct; and
   a cooling element positioned inside the tank and configured to provide a first cooling step on the compressed air in the first tank before the air is fed to the flow duct; wherein
   the flow duct is positioned and configured to perform a second step of cooling of the compressed air by permitting a first cooling medium to pass over the duct;
   the first tank has a first surface, the first surface defining an aperture of the tank;
   the cooling element comprises a second surface positioned inside the aperture, a third surface opposite to the first surface, and a second tank located on the third surface on the exterior of the first tank; and
   a seal is positioned inside the aperture between the first surface and the second surface, the seal being positioned so as to absorb relative movement of the tank and the cooling element,
   the first tank and the flow duct being positioned and configured so that the compressed air flows past the cooling element in a first direction and flows through the flow duct in a second direction, the second direction being lateral to the first direction.

2. The charge air cooler according to claim 1, wherein the cooling element comprises at least one tubular component in the first tank, the at least one tubular component being configured to lead a second cooling medium inside the first tank and to the second tank.

3. The charge air cooler according to claim 2, further comprising protruding portions of material on the at least one tubular component, the protruding portions being positioned and configured to increase a contact surface of the cooling element with respect to the compressed air in the first tank.

4. The charge air cooler according to claim 2, wherein the at least one tubular component is positioned and configured to lead therethrough the second cooling medium, the second cooling medium being a liquid.

5. The charge air cooler according to claim 4, wherein the liquid second cooling medium is radiator fluid of a combustion engine cooling system.

6. The charge air cooler according to claim 1, wherein the at least one tubular element is made of a material with heat-conducting characteristics sufficient for dissipating heat from the charge air cooler.

7. The charge air cooler according to claim 1, wherein the at least one tubular element is made of aluminum.

8. The charge air cooler according to claim 1, wherein the first cooling medium is surrounding air.

9. The charge air cooler according to claim 1, wherein the seal is an annular seal positioned to absorb the relative movement of the tank and the cooling element.

10. The charge air cooler according to claim 1 and a radiator configured to cool a liquid second cooling medium of a combustion engine cooling system,
    wherein the cooling element is configured to provide the first cooling step by receiving the liquid second cooling medium.

* * * * *